No. 880,246. PATENTED FEB. 25, 1908.
J. SECHLER.
PLUMB AND LEVEL.
APPLICATION FILED AUG. 10, 1907.
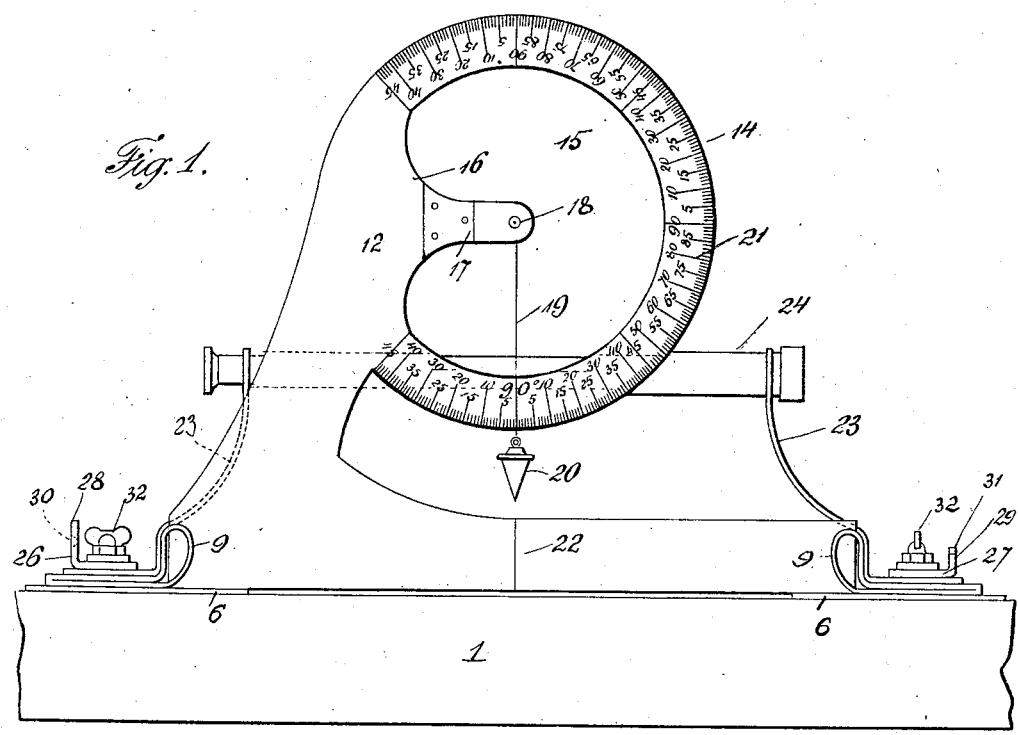
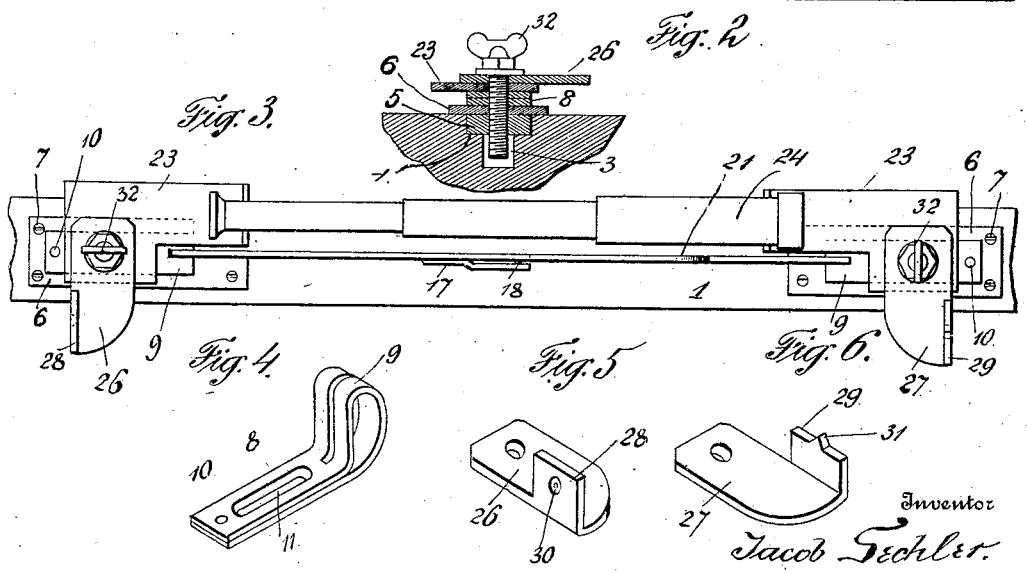
Witnesses
A. H. Rabsag.
Inventor
Jacob Sechler.
By
Attorneys
THE NORRIS PETERS CO., WASHINGTON, D. C.

UNITED STATES PATENT OFFICE.

JACOB SECHLER, OF ECONOMY, PENNSYLVANIA.

PLUMB AND LEVEL.

No. 880,246.  Specification of Letters Patent.  Patented Feb. 25, 1908.

Application filed August 10, 1907. Serial No. 387,952.

*To all whom it may concern:*

Be it known that I, JACOB SECHLER, a citizen of the United States of America, residing at Economy, in the county of Beaver and State of Pennsylvania, have invented certain new and useful Improvements in Plumbs and Levels, of which the following is a specification, reference being had therein to the accompanying drawing.

This invention relates to combined plumbs and levels, and the invention has for its object to combine a plumb and level into a useful instrument for carpenters, masons and similar artisans.

Briefly described, my improved instrument consists of a bar or body upon which is mounted a plumb attachment, a telescope attachment, and a sighting attachment, these attachments being secured to the bar or body of the instrument, whereby either or all of said attachments can be used.

The detail construction entering into my invention will be presently described, and then specifically pointed out in the appended claims.

Referring to the drawing forming a part of this specification, Figure 1 is an elevation of the combined plumb and level, Fig. 2 is a detail sectional view of the same, Fig. 3 is a plan of the plumb and level, Fig. 4 is a perspective view of one of the plumb fasteners, and Figs. 5 and 6 are perspective views of sight attachments.

In the accompanying drawings, 1 indicates a bar constituting the body of the instrument. The edge of the bar 1 is provided with two openings 3, and is recessed as at 4, to accommodate nuts 5. Over the nuts 5 are mounted escutcheon plates 6, these escutcheon plates being secured to the bar by screws 7.

Upon the escutcheon plates 6 are placed plumb fasteners 8, said fasteners being constructed of pieces of metal bent to provide slotted uprights 9, the ends of said pieces of metal being secured together by rivets 10, and provided with elongated slots 11. These plumb fasteners can be cast if desired. Held by the slotted uprights 9 of said plumb fasteners is a plumb frame 12, constructed of a sheet of metal shaped to provide a substantially circular head 14, having a central opening 15, into which protrudes an arm 16 forming part of the frame 12. The arm 16 is provided with a plate 17 and in said plate and the arm 16 is arranged a transverse pin 18 carrying a plumb line 19, the lower end of which is provided with a plumb bob 20. The head 14 upon one side thereof is graduated, as at 21, said graduations representing degrees, whereby the position of the plumb line 19 with relation to the head will determine the angularity of the bar 1. The horizontal position of the bar 1 is indicated by the plumb line 19 being at the 90 degree mark or graduation on the scale 21 of the head 14 and in alinement with a mark or groove 22 made upon the frame 12 of the plumb attachment.

Mounted upon the plumb fasteners are Y's 23 constituting supports for the telescope, these Y's supporting a horizontal telescope casing 24. The telescope casing 24 is arranged in the rear of the plumb frame 12, and is of that type commonly used by surveyors.

Mounted upon the Y's 23 of the telescope are sights 26 and 27, these attachments being made of metallic plates having vertical extensions 28 and 29, respectively, the extension 28 being apertured to provide a sight opening 30, while the extension 29 is provided with a pointed lug 31. These sights are positioned in front of the frame 12 and are used for alining the instrument with some distant object.

All of the attachments above described are retained in engagement with the bar 1 by winged thumb screws 32, said screws passing through the sights, the Y's 23 of the telescope attachment, the plumb fasteners 8, escutcheon plates 6, and engaging in the nuts 5 of the bar 1.

From the foregoing description, it will be observed that either attachment can be removed, thereby not requiring the entire bar equipment when the instrument is used for certain purposes.

The various attachments are constructed of light and durable metal and are adapted to provide a complete instrument which can be easily manipulated for determining planes and angles.

Having now described my invention, what I claim as new is:—

1. A combined level and plumb embodying a bar, nuts embedded therein, escutcheon plates mounted over said nuts, plumb fasteners mounted upon said plates and having slotted uprights, a plumb frame carried by said uprights, said frame comprising a circular head having a central opening, an arm projecting into said opening, a plumb bob suspended from said arm, Y's arranged upon said plumb fasteners, a telescope casing carried by said Y's, and thumb screws for holding all of said attachments upon said bar, said screws passing through said attachments and engaging in said nuts.

2. An instrument of the type described, embodying a bar, nuts embedded therein, slotted plumb fasteners arranged above said nuts, a plumb frame carried by said fasteners, said frame comprising a circular head, a plumb bob suspended centrally of said head, Y's arranged upon said plumb fasteners, a telescope casing carried by said Y's, sight attachments arranged above said Y's, and thumb screws engaging in said nuts for holding all of said attachments upon said bar.

3. An instrument of the type described embodying a bar, plumb fasteners arranged thereon and having slotted uprights, a plumb frame held in said slotted uprights of the fasteners, said frame comprising a graduated head, an arm projecting into the head, a plumb bob suspended from said arm centrally of the head, Y's arranged above said fasteners, a telescope carried by said Y's, and securing means common to both the Y's and the fasteners for securing the same to said bar.

4. An instrument of the type described embodying a bar, plumb fasteners mounted thereon and having slotted uprights, a plumb frame seated in said slotted uprights and having a graduated circular head, an arm projecting into the head, a telescope supported at one side of said plumb frame, sights arranged upon said bar, and securing means common to the fasteners, the telescope, and the sights for securing the same to said bar.

In testimony whereof I affix my signature in the presence of two witnesses.

JACOB SECHLER.

Witnesses:
A. L. PATON,
W. C. BOTT.